(12) United States Patent
Ehrlich

(10) Patent No.: US 7,761,173 B2
(45) Date of Patent: Jul. 20, 2010

(54) PREDICTIVE DISPLAY FOR A SYSTEM HAVING DELAYED FEEDBACK OF A COMMAND ISSUED

(75) Inventor: Avshalom Ehrlich, Kibutz Ramat Hashofet (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 0 days.

(21) Appl. No.: 10/566,246

(22) PCT Filed: Jul. 25, 2004

(86) PCT No.: PCT/IL2004/000680

§ 371 (c)(1), (2), (4) Date: Jan. 30, 2006

(87) PCT Pub. No.: WO2005/010639

PCT Pub. Date: Feb. 3, 2005

(65) Prior Publication Data

US 2006/0187224 A1 Aug. 24, 2006

(30) Foreign Application Priority Data

Jul. 29, 2003 (IL) .................................. 157156

(51) Int. Cl.
G06T 15/00 (2006.01)
(52) U.S. Cl. .................... 700/83; 345/522; 701/25
(58) Field of Classification Search .................... 700/83; 345/522; 701/25
See application file for complete search history.

(56) References Cited

U.S. PATENT DOCUMENTS

| 4,405,943 | A | * | 9/1983 | Kanaly | 375/240.08 |
|---|---|---|---|---|---|
| 4,661,849 | A | * | 4/1987 | Hinman | 375/240.16 |
| 4,682,225 | A | * | 7/1987 | Graham | 375/240.21 |
| 4,855,822 | A | * | 8/1989 | Narendra et al. | 348/114 |
| 5,155,683 | A | * | 10/1992 | Rahim | 701/25 |
| 5,489,099 | A | * | 2/1996 | Rankin et al. | 473/199 |
| 5,971,319 | A |  | 10/1999 | Lichtenberg et al. |  |
| 6,840,627 | B2 | * | 1/2005 | Olbrich | 353/42 |
| 2002/0180878 | A1 | * | 12/2002 | Iida et al. | 348/333.02 |
| 2002/0186221 | A1 |  | 12/2002 | Bell |  |

OTHER PUBLICATIONS

"Efficacy of a Predicitive Display, Steering Device, and Vehicle Body Representation in the Operation of a Lunar Vehicle" By Mathan, Hyndman, Fischer et al; Department of Computer Science-Carnegie Mellon Univ.; http://www.acm.org/sigchi/chi96/chi96/proceedings/intpost/Mathan/ms_txt.HTM.

"Efficacy of a Predictive Display, Steering Device, a Vehicle Body Representation in the Operation of a Lunar Vehicle", by Mathan, Hyndman, Fischer et al., Dept. Of Computer Science—Carnegie Mellon Univ, http://acm.org/sigchi/chi96/chi96'proceeding/intpost/Mathan/ms_txt.HTM, Jan. 22, 2003.

* cited by examiner

Primary Examiner—Albert DeCady
Assistant Examiner—Tejal J Gami
(74) Attorney, Agent, or Firm—Mark M. Friedman

(57) ABSTRACT

A method to provide feedback to an operator of a device having feedback delay. The method includes the steps of displaying a first image of a view from the device, the device being at a first position, issuing a movement command to cause a desired movement of the device to a second position, and displaying a second image of a predicted view from the device at the second position prior to the operator receiving real feedback of the movement command.

16 Claims, 7 Drawing Sheets

US 7,761,173 B2

PREDICTIVE DISPLAY FOR A SYSTEM HAVING DELAYED FEEDBACK OF A COMMAND ISSUED

FIELD AND BACKGROUND OF THE INVENTION

The present invention relates to a predictive display and, in particular, it concerns a predictive display for a system having delayed feedback of a command issued.

By way of introduction, remotely operated devices generally require feedback from the device to the operator, so that the operator can decide on what action to take next. This is generally achieved by having a video camera or other similar apparatus disposed on the device. The video camera then relays feedback of the position of the device with respect to its surroundings. However, there is a time delay, typically of up to several seconds, between the time when the operator gives a movement command to the device and when the operator receives feedback with respect to the completion of the movement command. The delay is typically due to several factors. First, there may be a transmission time delay due to communication from the operator to the device and from the device to the operator. Second, there is a time delay due to the time taken by the device to carry out the movement command. Therefore, the operator needs a prediction of the final position of the device at the time the movement command is being created to be able to decide whether the movement command is appropriate. A solution taught by the prior art is to superimpose an icon such as a motion vector or arrow to represent the movement command. The beginning of the vector or arrow denotes the current position and the end of the vector or the arrowhead denotes the predicted position after the movement command has been carried out or the predicted position after a predetermined time interval. A shortcoming of the aforementioned system is due to the system not being intuitive to the operator. An operator needs to pay close attention to the arrow or vector. A further shortcoming of the aforementioned system is that the image of the view from the device as well as the superimposed vector are updated as the device moves, causing further confusion to the operator as well reduced operator performance.

There is therefore a need for an intuitive predictive display for a system having delayed feedback of a command issued.

SUMMARY OF THE INVENTION

The present invention is a predictive display for a system having delayed feedback of a command issued.

According to the teachings of the present invention there is provided a method to provide feedback to an operator of a device having feedback delay, comprising the steps of: (a) displaying a first image of a view from the device, the device being at a first position; (b) issuing a movement command to cause a desired movement of the device to a second position; and (c) displaying a second image of a predicted view from the device at the second position prior to the operator receiving real feedback of the movement command.

According to a further feature of the present invention, the second image is based upon at least part of the first image.

According to a further feature of the present invention, the second image includes a filler section outside of the at least part of the first image.

According to a further feature of the present invention, the filler section includes a pattern.

According to a further feature of the present invention, the filler section includes a repetitive pattern.

According to a further feature of the present invention, the filler section includes historic image data of the predicted view.

According to a further feature of the present invention, there is also provided the step of displaying a third image of an actual view from the device at the second position.

According to a further feature of the present invention, there is also provided the step of limiting the movement command to ensure that the second image can be based upon at least part of the first image.

According to a further feature of the present invention, the step of issuing the movement command and the step of displaying the second image, occur substantially at the same time.

According to a further feature of the present invention, the step of displaying the first image is performed by displaying the first image on a screen, the screen having a frame disposed thereon, the first image being disposed substantially within the frame and wherein the step of displaying the second image is performed by displaying the second image on the screen such that, the second image includes substantially all image elements of the first image.

According to the teachings of the present invention there is also provided, a feedback system for an operator of a device having a camera, comprising: (a) a control arrangement configured for issuing a movement command to cause a desired movement of the device from a first position to a second position; and (b) a display configured for: (i) displaying a first image of a view from the device, the device being at a first position; and (ii) displaying a second image prior to the operator receiving real feedback of the movement command, the second image being a predicted view from the device at the second position, the second image being based upon at least part of the first image.

According to a further feature of the present invention, the display is further configured for displaying a third image of an actual view from the device at the second position.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a predictive display for a predictive display for a system having delayed feedback of a command issued.

The principles and operation of a predictive display for a system having delayed feedback of a command issued according to the present invention may be better understood with reference to the drawings and the accompanying description.

Figure 1:
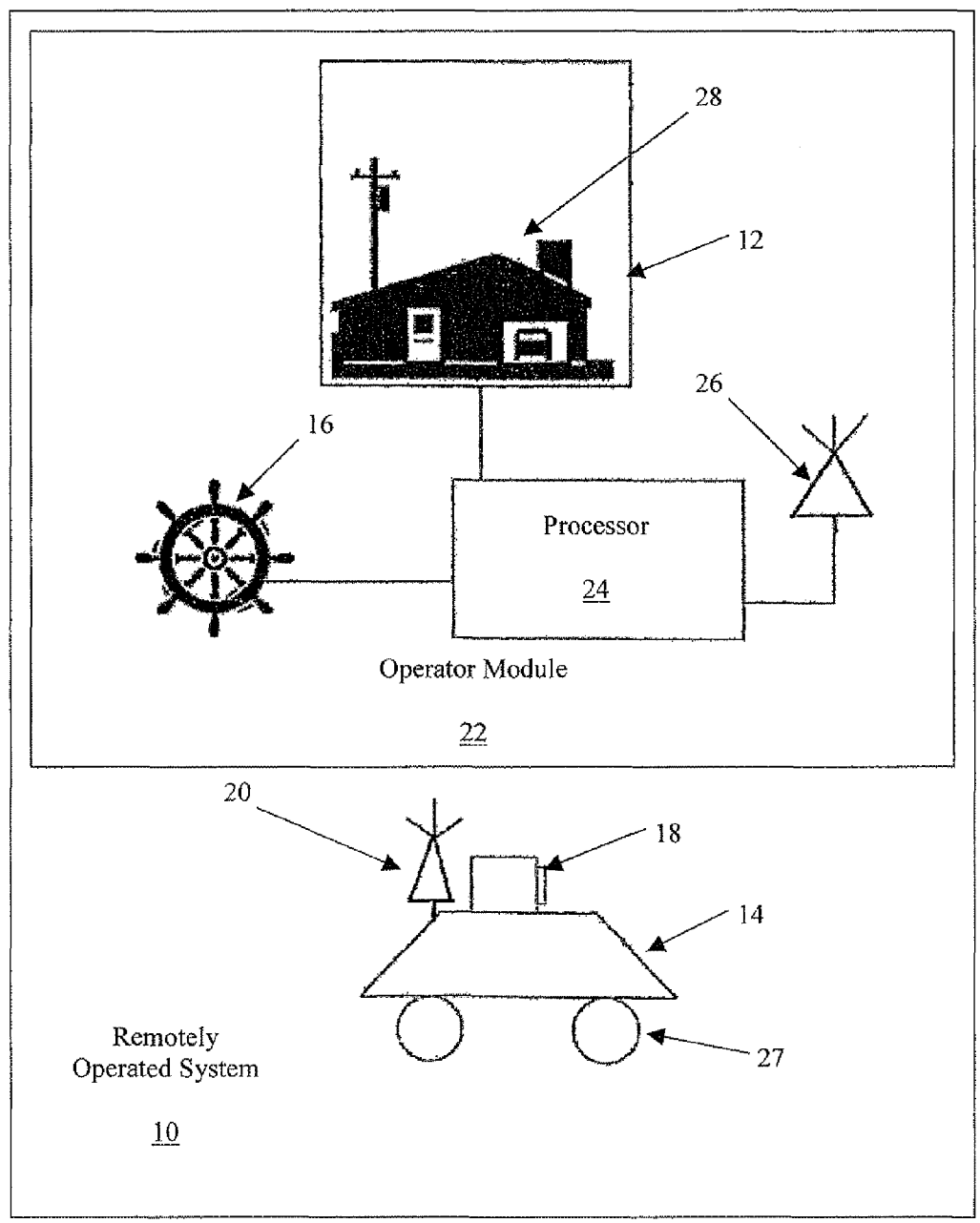
FIG. 1 is a schematic view of a remotely operated system having a display that is constructed and operable in accordance with a preferred embodiment of the present invention.

Reference is now made to FIG. 1, which is a view of a remotely operated system 10 having a display 12 that is constructed and operable in accordance with a preferred embodiment of the present invention. Remotely operated system 10 also has a remotely controlled device 14 and an operator module 22. Device 14 has disposed thereon, a camera 18 and a transceiver 20. Device 14 is typically a remotely operated vehicle or surveillance camera arrangement. It will be apparent to those skilled in the art that when device 14 is a surveillance camera, movement of device 14 is represented by movements and zooming of camera 18. However, it will be apparent to those skilled in the art that device 14 could be any device requiring operator control via a predictive display. Additionally, it will be appreciated by those ordinarily skilled in the art that remotely operated system 10 includes systems whereby the operator is disposed within or on top of device 14. Operator module 22 includes display 12, a movement controller 16, a processor 24 and a transceiver 26. Camera 18 is configured to send images of views from device 14 via transceiver 20 to transceiver 26. Transceiver 20 and transceiver 26 typically define a wireless communication link. However, it will be apparent to those skilled in the art that processor 24 and device 14 may be connected using a communication cable or other communication link. Images received by transceiver 26 are processed by processor 24 and then displayed by display 12. The frequency of images received by transceiver 26 is typically frequent enough, such that, the view from camera 18 is viewed by the operator as a "continuous" video or a series of discrete images. The operator issues movement commands to device 14 using movement controller 16. Movement controller 16 is typically includes a joystick or pointing device such as a mouse or a steering wheel as well as an other movement control devices capable of instructing regarding direction and steering as well as zooming a lens of camera 18. Movement commands are sent via processor 24, transceiver 26 and transceiver 20 to an actuator 27 which is configured to move device 14. As camera 18 is generally disposed in a known relationship with respect to device 14, images of views captured by camera 18 define the position and orientation of device 14 in relation to the surroundings. Display 12 shows an image 28 of a view from device 14 while device 14 is at a first position. It should be noted that image 28 is updated constantly to reflect views captured by camera 18 of the first position, taking into account the delay between camera 18 capturing the view and predictive display 12 displaying image 28.

By way of introduction, due to the time delay between the operator issuing a movement command to cause a desired movement of device 14 from the first position to a second position and the operator receiving feedback of that movement command, the operator needs a way to visualize the final position due to the movement command at the time the movement command is issued. The desired movement may be linear, rotational or a more complex movement. Therefore, according to the present invention, a predicted image of the view from device 14 at the second position is displayed on display 12 typically at the time the operator issues the movement command, which is prior to the operator receiving real feedback of the actuated movement command. Real feedback is defined herein as an actual image of a view from camera 18 at the second position and not a predicted image of a view from camera 18 at the second position.

Figure 2:
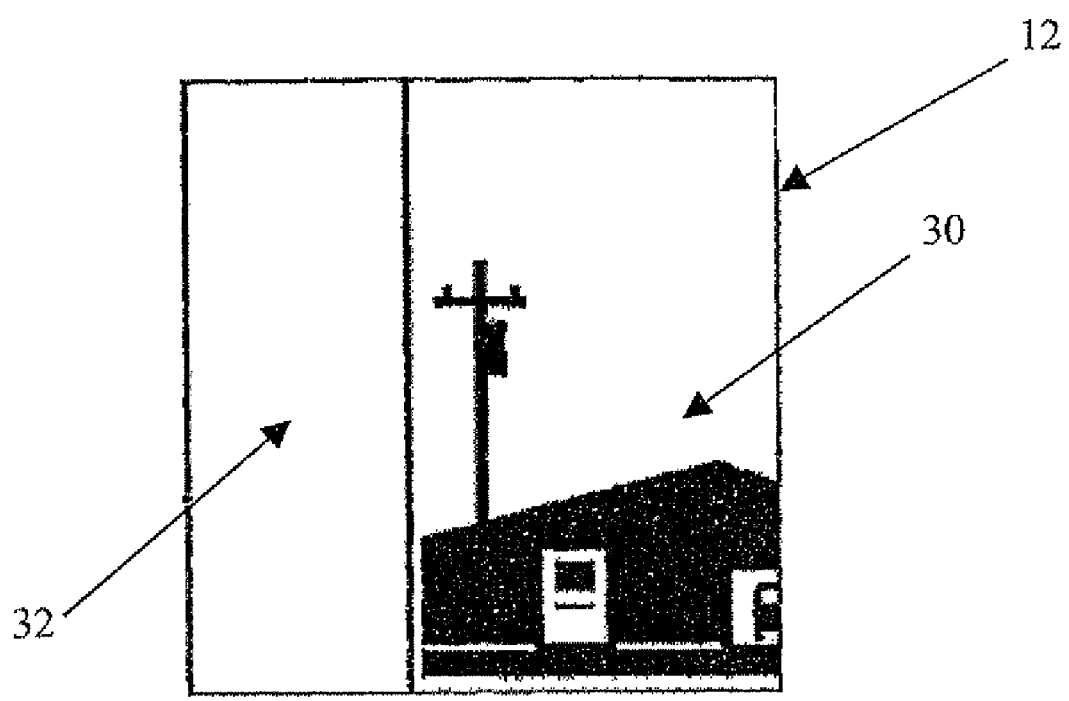
FIG. 2 is a view of the display of FIG. 1 showing an image of a predicted view from the device due to a movement command.

Reference is now made to FIG. 2, which is a view of display 12 showing an image 30 of a predicted view from device 14 due to a movement command. Remotely operated system 10 is configured such that image 30 of the predicted view from device 14 at the second position is displayed on display 12 at substantially the same time that a movement command is issued. Therefore, image 30 is displayed prior to the operator receiving real feedback of the actuated movement command. Image 30 is based upon at least part of image 28 (FIG. 1). It will be appreciated by those skilled in the art that as movement controller 16 is actuated, the image displayed on predictive display 12 is altered to reflect the current predicted view from camera 18 after the movement command is complete. The current predicted view from camera 18 after the movement command is complete, is formed by manipulating image 28, for example by moving or scaling or rotating image 28, as appropriate, such that, the center of an image of a view from camera 18 at the second position corresponds to the center of predictive display 12. Scaling of image 28 is necessary where forward and reverse movement commands are issued. Other manipulation of image 28 is performed to reflect the desired results. Scaling of image 28 is illustrated with reference to FIG. 5. Therefore, as movement controller 16 is actuated, the image displayed by predictive display 12 gradually changes from image 28 to image 30. Therefore, there is a plurality of images which are displayed on predictive display 12, which represent the actuating of movement controller 16 in order to move device 14 from the first position to the second position. In the example of FIG. 2, the movement command given by the operator to move device 14 from the first position to the second position was to turn device 14 in a left direction. Therefore, in this example, the right portion of image 30 is formed by using most of image 28 except for part of the right portion of image 28. The left portion of image 30 has a blank "filler" section 32 indicative of image data which cannot be derived from image 28. It should be noted that as the operator moves the steering control of movement controller 16 to the left, image 30 will change to include gradually less of the right portion of image 28 and more of "filler" section 32. It will be appreciated by those skilled in the art that other operations including lateral, rotational, scaling and other image manipulations may be performed by processor 24 on image 28 to create image 30 depending on the desired movement command. Additionally, image 30 may be created by processor 24 using advanced image processing techniques to produce an image which is based upon image 28 as well as other images of prior views stored by remotely operated system 10. It should be noted that image 30 is created by altering image 28 to reflect the predicted view from camera 18 when device 14 is at the second position and not by superimposing an arrow or vector on image 28 to show where the second position is. Typically, processor 24 instructs actuator 27 to automatically execute the movement commands as steering occurs. Optionally, the movement command is manually confirmed to actuator 27 of device 14 to commence actual execution of the movement command. Actuator 27 then completes the desired movement of device 14 to the second position. Although image 30 continually reflects an image of the predicted view at the second position, image 30 is continually updated by views captured by camera 18 even while camera 18 is moving.

As an optional feature, the movement command is limited to ensure that image 30 can be based upon at least part of image 28 so that the operator will be able to visualize at least partially the effect of the movement command. If the movement command is such that the second position cannot be described using image 28 then image 30 will be blank unless other historic data is available.

Figure 3:
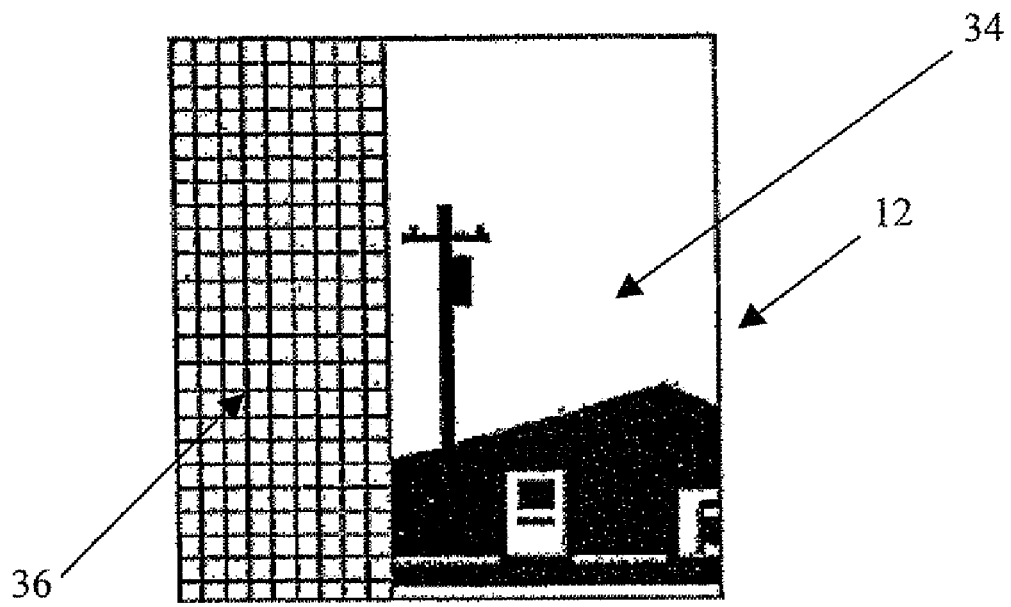
FIG. 3 is a view of the display of FIG. 1 showing an image of a predicted view from the device due to a movement command, the image including a repetitive pattern "filler" section that is constructed and operable in accordance with a first alternate embodiment of the present invention.

Reference is now made to FIG. 3, which is a view of display 12 showing an image 34 of a predicted view from device 14 due to a movement command. Image 34 includes a "filler" section 36 that is constructed and operable in accordance with a first alternate embodiment of the present invention. Filler section 36 is typically a static pattern which is manipulated in the same way as image 34, for example, by translation, rotation or scaling. Filler section 36 is generally a repetitive pattern such as a grid. Optionally, additional historic image data of the predicted view is used to fill in the filler section of image 34 instead of using a blank filler or a repetitive pattern filler. The historic image data is based on previous images at or close to the second position.

Figure 4:
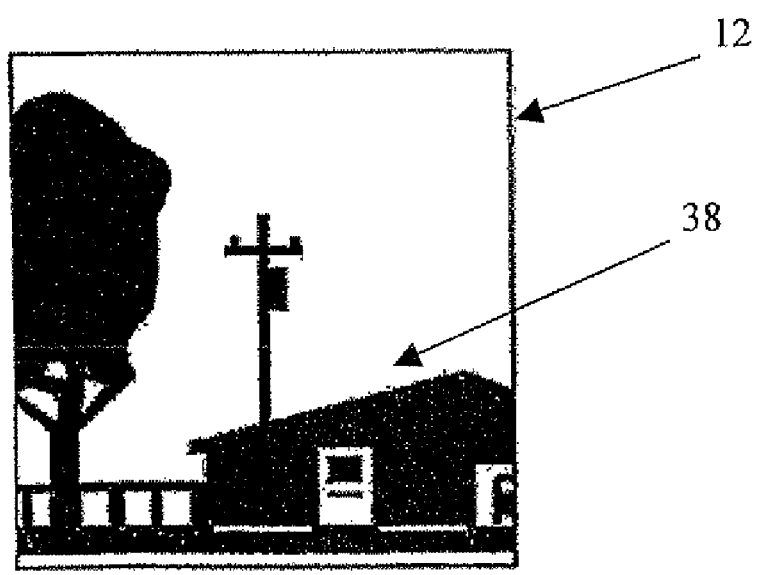
FIG. 4 is a view of the display of FIG. 1 showing an image of the actual view from the device after the movement command has been completed and the image of the view from a camera at the new position has been received.

Reference is now made to FIG. 4, which is a view of display 12 showing an image 38 of the actual view from device 14 after the movement command has been completed and the image of the view from camera 18 at the second position have been received by operator module 22. It should be noted that image 38 is formed by gradual changes to image 30 as camera 18 captures views as camera 18 moves.

Figure 5:
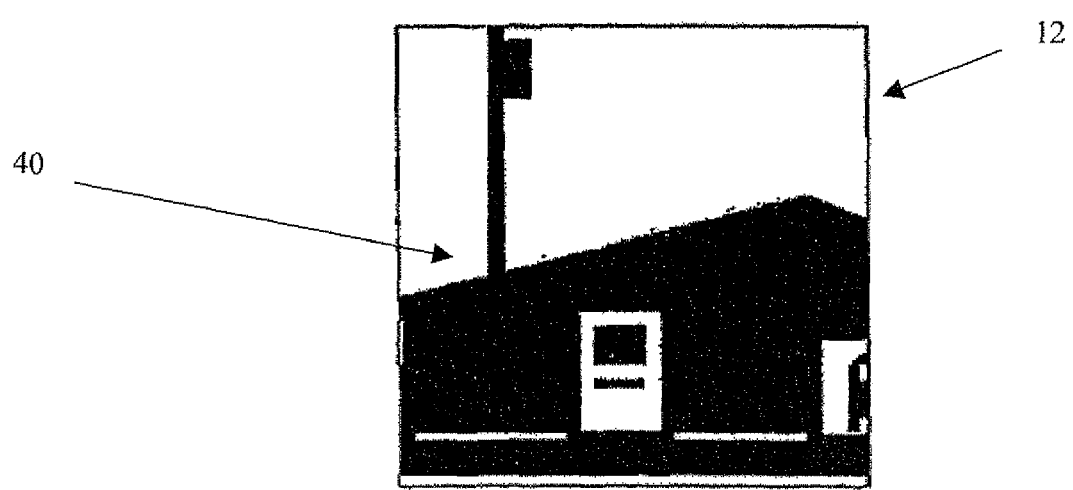
FIG. 5 is a view of the display of FIG. 1 showing the image of a predicted view from the device due to a forward or zoom-in movement command.

Reference is now made to FIG. 5, which is a view of display 12 showing an image 40 of a predicted view from device 14 due to a forward or zoom-in movement command. It is seen that image 40 is an enlarged version of image 28 (FIG. 1). Therefore, image 40 reflects the forward or zoom-in movement command, which brings the objects of image 28 closer.

Figure 6:
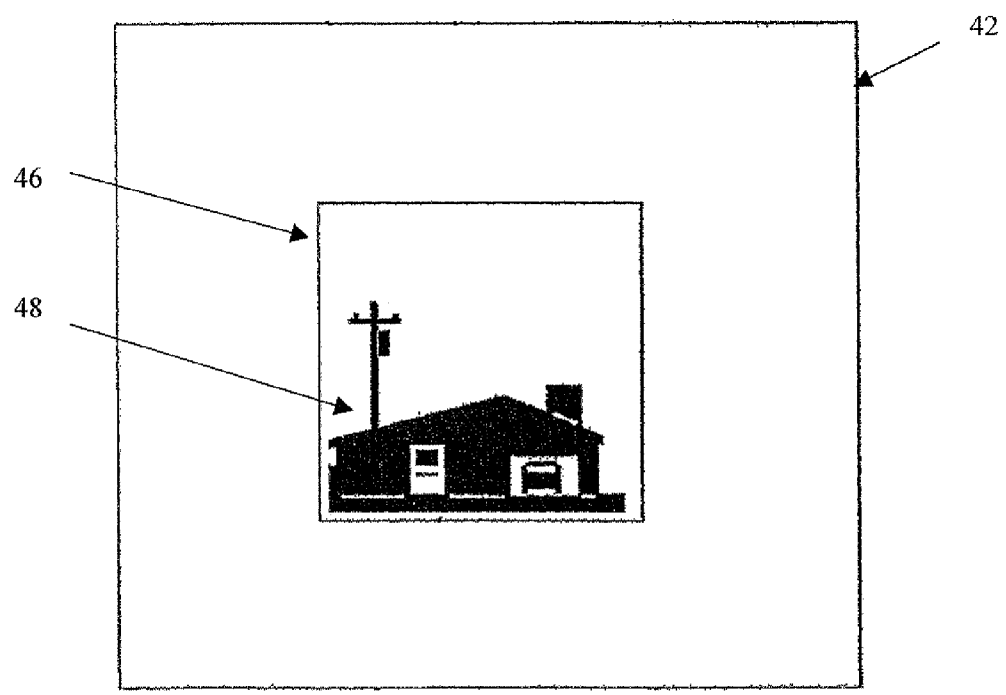
FIG. 6 is a view of a display prior to issuing a movement command that is constructed and operable in accordance with a second alternate embodiment of the present invention.
Figure 7:
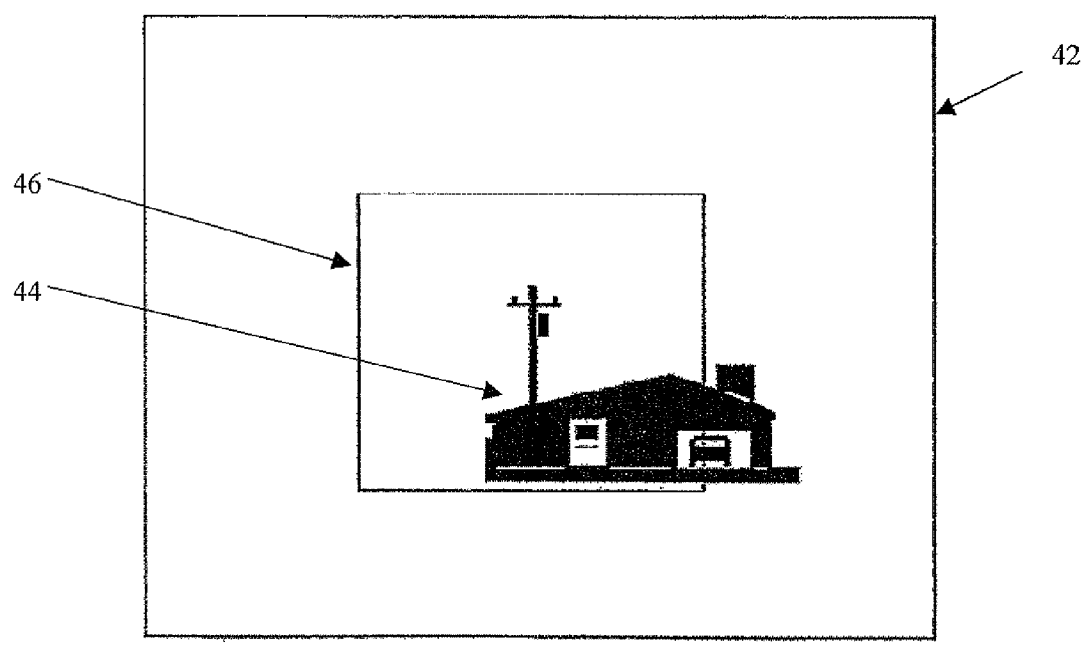
FIG. 7 is a view of the display of FIG. 6 showing an image of a predicted view from the device due to a movement command.

Reference is now made to FIG. 6 and FIG. 7. FIG. 6 is a view of a display 42 prior to issuing a movement command that is constructed and operable in accordance with a second alternate embodiment of the present invention. FIG. 7 is a view of display 42 showing an image 44 of a predicted view from device 14 due to a movement command. Display 42 has a centrally disposed frame 46. Frame 46 is either an image or a permanent fixture which is disposed on display 42. Before a movement command is issued, an image 48 of an actual view from device 14 is displayed wholly within frame 46. At this point, device 14 is at a first position. The operator then issues a movement command, for example, to move device 14 to the left to a second position. As the movement command is issued, image 44 is displayed on display 42. Image 44 is image 48 which is moved to the right on display 42 and partially outside of frame 46 to reflect the steering to the left by the operator. However, substantially all image elements of image 48 are included within image 44. The term "substantially all image elements are included" is defined herein to include, for example, when some of the details of image 48 are lost due to scaling of image 48 to produce image 44.

Figure 8:
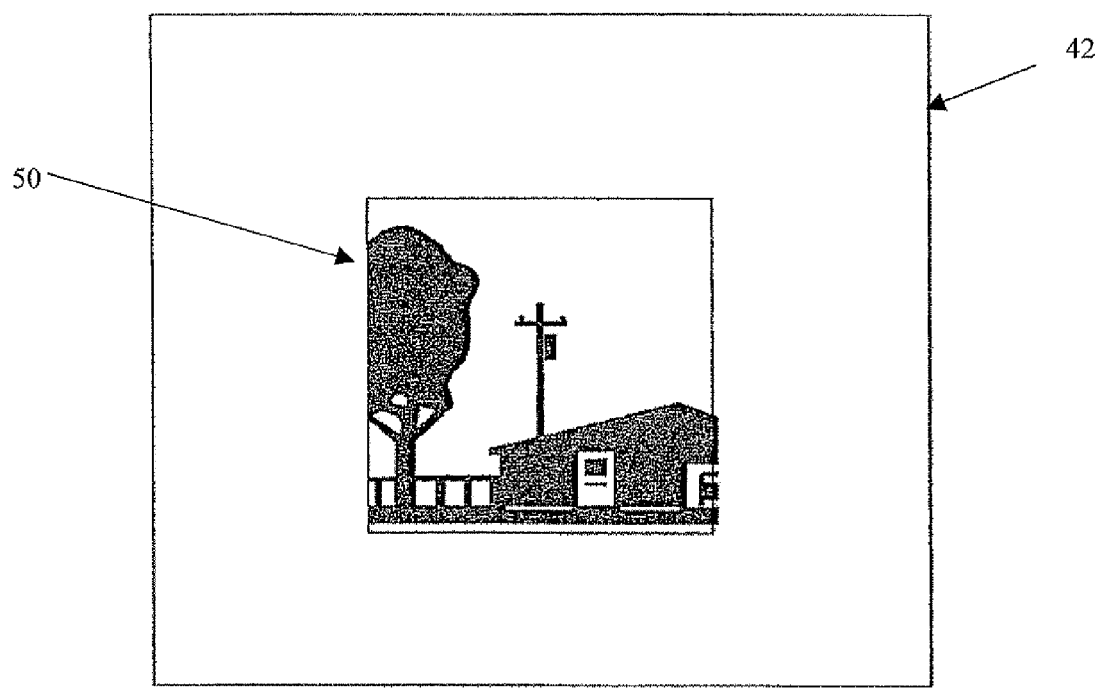
FIG. 8 is a view of the display of FIG. 6 showing an image of the actual view from the device after the movement command has been completed and the image of the view from a camera at the new position has been received.

Reference is now made to FIG. 8, which is a view of predictive display 42 showing an image 50 of the actual view from device 14 after the movement command has been completed and the image of the view from camera 18 at the second position has been received.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art which would occur to persons skilled in the art upon reading the foregoing description.

What is claimed is:

1. A method to provide feedback to an operator of a device, comprising the steps of
   (a) providing a device having a feedback delay;
   (b) displaying upon at least a portion of a display a first image of a view from said device, said device being at a first position;
   (c) issuing a movement command to cause a desired movement of said device to a second position; and
   (d) prior to the operator receiving real feedback of said movement command:
      (i) predicting a second image of a view from said device at said second position, said predicting including a processor modifying said first image according to an operation selected from the group consisting of translation, rotation, magnification and reduction, and
      (ii) displaying said second image substantially on said at least portion of said display on which said first image is displayed, said second image replacing said first image.

2. The method of claim 1, wherein said second image is based upon at least part of said first image.

3. The method of claim 2, wherein said second image includes a filler section outside of said at least part of said first image.

4. The method of claim 3, wherein said filler section includes a pattern.

5. The method of claim 4, wherein said filler section includes a repetitive pattern.

6. The method of claim 3, wherein said filler section includes historic image data of said predicted view.

7. The method of claim 1, further comprising the step of:
   (e) displaying a third image of an actual view from said device at said second position.

8. The method of claim 1, further comprising the step of:
   (e) limiting said movement command to ensure that said second image can be based upon at least part of said first image.

9. The method of claim 1, wherein said step of issuing said movement command and said step of displaying said second image, occur substantially at the same time.

10. The method of claim 1, wherein said step of displaying said first image is performed by displaying said first image on a screen, said screen having a frame disposed thereon, said first image being disposed substantially within said frame and wherein said step of displaying said second image is performed by displaying said second image on said screen such that, said second image includes substantially all image elements of said first image.

11. A feedback system for an operator, comprising:
    (a) a device including a camera;
    (b) a control arrangement configured for issuing a movement command to cause a desired movement of said device from a first position to a second position; and
    (c) a display configured for:
       (i) displaying, upon at least a portion of said display, a first image of a view from said device, said device being at a first position; and
       (ii) prior to the operator receiving real feedback of said movement command:
          (A) predicting a second image of a view from said device at said second position, said predicting including a processor modifying said first image according to an operation selected from the group consisting of translation, rotation, magnification and reduction, and (B) displaying said second image substantially on said at least portion of said display on which said first image is displayed, said second image replacing said first image.

12. The system of claim 11, wherein said display is further configured for displaying a third image of an actual view from said device at said second position.

13. The method of claim 3, wherein said filler section includes filler image data and wherein at least a portion of said filler image data is manipulated in a manner substantially corresponding to said movement command.

14. The system of claim 11, wherein said second image is based upon at least part of said first image and wherein said second image includes a filler section outside of said at least part of said first image and wherein said filler section includes filler image data and wherein at least a portion of said filler image data is manipulated in a manner substantially corresponding to said movement command.

15. The method of claim 1, wherein said device is a vehicle operative to be remotely controlled.

16. The system of claim 11, wherein said device is a vehicle operative to be remotely controlled.

* * * * *